US011862092B2

(12) United States Patent
Zheng

(10) Patent No.: US 11,862,092 B2
(45) Date of Patent: Jan. 2, 2024

(54) DISPLAY PANEL

(71) Applicant: WUHAN CHINA STAR OPTOELECTRONICS SEMICONDUCTOR DISPLAY TECHNOLOGY CO., LTD., Hubei (CN)

(72) Inventor: Wu Zheng, Hubei (CN)

(73) Assignee: WUHAN CHINA STAR OPTOELECTRONICS SEMICONDUCTOR DISPLAY TECHNOLOGY CO., LTD., Hubei (CN)

(*) Notice: Subject to any disclaimer, the term of this patent is extended or adjusted under 35 U.S.C. 154(b) by 631 days.

(21) Appl. No.: 16/971,900

(22) PCT Filed: Jun. 24, 2020

(86) PCT No.: PCT/CN2020/098228
§ 371 (c)(1),
(2) Date: Aug. 21, 2020

(87) PCT Pub. No.: WO2021/243772
PCT Pub. Date: Dec. 9, 2021

(65) Prior Publication Data

US 2023/0110158 A1 Apr. 13, 2023

(30) Foreign Application Priority Data

Jun. 2, 2020 (CN) ......................... 202010489493.5

(51) Int. Cl.
*G09G 3/3258* (2016.01)

(52) U.S. Cl.
CPC ... *G09G 3/3258* (2013.01); *G09G 2300/0819* (2013.01); *G09G 2310/0264* (2013.01); *G09G 2320/0233* (2013.01)

(58) Field of Classification Search
CPC ............... G09G 2310/0256; G09G 2310/0264
See application file for complete search history.

(56) References Cited

U.S. PATENT DOCUMENTS 6,222,357 B1 4/2001 Sakuragi
2007/0080908 A1* 4/2007 Nathan ................. G09G 3/325 345/77

(Continued)

FOREIGN PATENT DOCUMENTS

CN 1816837 A 8/2006
CN 102708789 A 10/2012

(Continued)

OTHER PUBLICATIONS

KR20140071303A Kwon Oh Kyong May 12, 2014 (Year: 2014).*

*Primary Examiner* — Van N Chow

(57) ABSTRACT

The present application provides a display device. The display device includes a pixel circuit and multiple operational amplifiers. Pixel units in the same column are electrically connected to the same operational amplifier. The display device of the present application uses the operational amplifier to stabilize a voltage and amplify a current, which solves non-uniformity of the display panel caused by the difference in a threshold voltage and channel electron mobility of the thin film transistor due to an immature manufacturing process of a thin film transistor, so uniformity of the panel is improved.

15 Claims, 2 Drawing Sheets

(56) References Cited

U.S. PATENT DOCUMENTS

| | | | | |
|---|---|---|---|---|
| 2010/0097360 | A1* | 4/2010 | Cho | G09G 3/325 345/205 |
| 2018/0204516 | A1 | 7/2018 | Hwang et al. | |
| 2021/0174740 | A1* | 6/2021 | Qian | G09G 3/3233 |
| 2021/0407434 | A1* | 12/2021 | Shan | G09G 3/3275 |

FOREIGN PATENT DOCUMENTS

| | | | |
|---|---|---|---|
| CN | 105895020 | A | 8/2016 |
| CN | 106910465 | A | 6/2017 |
| CN | 107293239 | A | 10/2017 |
| CN | 108399889 | A | 8/2018 |
| JP | 2000081920 | A | 3/2000 |
| JP | 2005266089 | A | 9/2005 |
| KR | 20140071303 | A | 6/2014 |

* cited by examiner

DISPLAY PANEL

FIELD OF DISCLOSURE

The present application relates to the field of light-emitting display technology and in particular, to a display device.

DESCRIPTION OF RELATED ART

The current trend for display panels is AMOLED (active-matrix organic light-emitting diode). However, because its manufacturing process has not yet reached maturity, each thin film transistor (TFT) at different positions in the same panel have different characteristics. In other words, there is a problem with non-uniform threshold voltages (Vth). Conventional pixel circuits (e.g., 7T1C) adopt a voltage compensation method for Vth. Although this method can meet the needs, it cannot compensate for influence caused by the difference in channel electron mobility of driving TFTs (DTFTs).

Therefore, it is necessary to provide a display device to solve non-uniformity of the display panel caused by the difference in the threshold voltage of the DTFT and the channel electron mobility due to the immature TFT manufacturing process.

SUMMARY

It is an objective of the present application to provide a display device that can solve non-uniformity of a display panel caused by the difference in a threshold voltage and the channel electron mobility due to immature manufacturing processes of driving thin film transistors, and thereby improve uniformity of the display panel.

The present application provides a display device, comprising:

a pixel circuit and at least one operational amplifier;

wherein the pixel circuit comprises at least one pixel unit, and the pixel unit comprises a driving transistor, a storage capacitor, and a light-emitting device;

the operational amplifier and the driving transistor constitute a negative feedback loop for controlling a voltage at an input terminal of the light-emitting device to be the same as a data voltage which is input externally;

the operational amplifier is configured to charge a storage capacitor, so that after the storage capacitor is charged, the light-emitting device is driven by the driving transistor to emit light, wherein a charging time for the operational amplifier to charge the storage capacitor is less than a predetermined value.

The present application utilizes the negative feedback of the operational amplifier, so that a current flowing through the light-emitting device in each pixel is irrelevant to the driving thin film transistor, thereby solving the problem of non-uniformity of the display panel due to different threshold voltages and channel electron mobility resulting from immature thin film transistor manufacturing processes. Accordingly, the uniformity of the panel is improved. In addition, the output voltage of the operational amplifier can quickly charge the storage capacitor, improve charging efficiency, and reduce a charging time. At the same time, under the control of the switch, the operational amplifier is disconnected when the operations are completed, thus less affecting the light emission of the pixel circuit and better controlling the operations of the pixel display device.

BRIEF DESCRIPTION OF DRAWINGS

A detailed description is provided below with reference to the accompanying drawings for ease of understanding of the technical solutions and specific embodiments of the present application. The accompanying drawings and their descriptions, as part of this specification, are only used to explain the technical solutions of the present application, and do not constitute a limitation to the application.

DETAILED DESCRIPTION OF EMBODIMENTS

A detailed description is provided below with reference to the accompanying drawings to clearly and completely explain how the technical solutions in the embodiments of the present application solve the problems of conventional techniques. Unless otherwise defined, all technical and scientific terms used herein have the meaning commonly understood by those skilled in the art. The terminology used in this specification is only for the purpose of describing specific embodiments, and cannot be regarded as a limitation to the present application. Based on the embodiments of the present application, all other embodiments obtained by those skilled in the art without creative work are within the protection scope of the present application.

Figure 1:
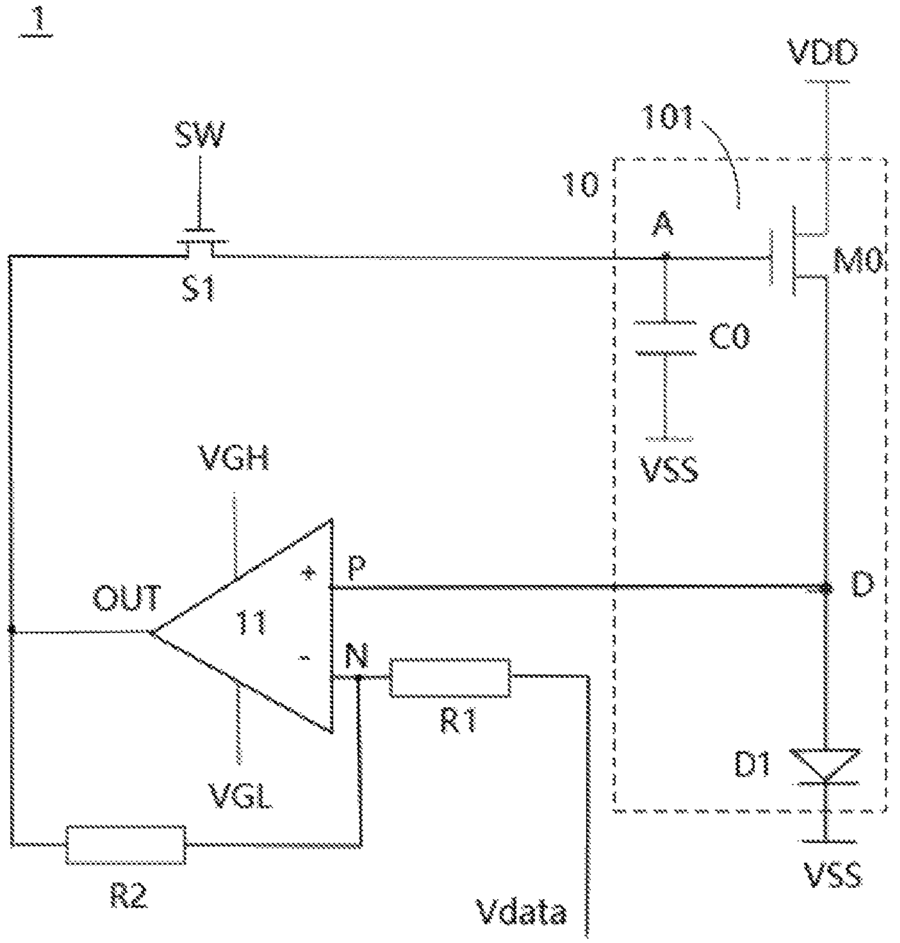
FIG. 1 is a schematic view illustrating circuit connection of a display device according to one embodiment of the present application.
Figure 2:
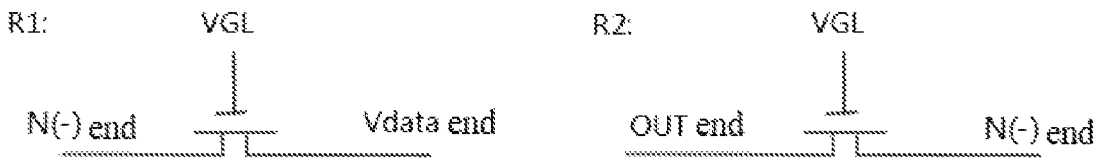
FIG. 2 is an equivalent circuit view illustrating resistors in a working state of an operational amplifier of the present application.

Please refer to FIG. 1 to FIG. 2. FIG. 1 is a schematic view illustrating circuit connection of a display device according to one embodiment of the present application, and FIG. 2 is an equivalent circuit view illustrating resistors in a working state of an operational amplifier of the present application.

As shown in FIG. 1, a display device 1 is provided according to one embodiment of the present application. The display device 1 comprises: a pixel circuit 10 and at least one operational amplifier (OP) 11. The pixel circuit 10 comprises at least one pixel unit 101, and the pixel unit 101 comprises a driving transistor M0, a storage capacitor C0, and a light-emitting device D1. The operational amplifier 11 and the driving transistor M0 constitute a negative feedback loop for controlling a voltage at an input terminal of the light-emitting device D1 to be the same as a data voltage $V_{data}$ input externally. The operational amplifier 11 is also configured to charge the storage capacitor C0, so that after the storage capacitor C0 is charged, the light-emitting device D1 is driven by the driving transistor M0 to emit light. A charging time for the operational amplifier 11 to charge the storage capacitor C0 is less than a predetermined value; that is, the operational amplifier 11 can output a high voltage, and the output voltage can quickly charge the storage capacitor C0, which improves the charging efficiency, so that the storage capacitor C0 can be fully charged quickly, and a charging time is reduced.

Specifically, in the present embodiment, a gate of the driving transistor M0 is electrically connected to a first common terminal A, a drain of the driving transistor M0 is electrically connected to a first power source VDD, and a source of the driving transistor M0 is electrically connected to a second common terminal D. A first terminal of the storage capacitor C0 is electrically connected to the first common terminal A, and a second terminal of the storage capacitor C0 is electrically connected to a second power source VSS. An anode of the light-emitting device D1 serves as its input terminal and is electrically connected to the second common terminal D, and a cathode of the light-emitting device is electrically connected to the second power source VSS. A non-inverting input terminal P of the operational amplifier 11 is electrically connected to the second common terminal D; an inverting input terminal N of the operational amplifier 11 is configured to receive the data voltage $V_{data}$ and is coupled to an output terminal OUT of the operational amplifier; and the output terminal OUT of the operational amplifier is coupled to the first common terminal A.

In the present embodiment, the driving transistor M0 is an N-type thin film transistor (TFT), and the light-emitting device D1 is an organic light-emitting diode (OLED). It should be noted that, in other embodiments, the light-emitting device can also be other devices that be excited to emit light by using electroluminescent materials.

In the present embodiment, the operational amplifier 11 further comprises a first power terminal and a second power terminal. The first power terminal is configured to connect to a power source VGH which supplies power (a high voltage) to the operational amplifier 11; the second power terminal is configured to connect to a power source VGL which supplies power (a low voltage) to the operational amplifier 11. This way, the operational amplifier 11, after receiving signals of the non-inverting input terminal P and the inverting input terminal N, calculates and outputs a voltage signal between a voltage value of the power source VGH and a voltage value of the power source VGL, so that Vg can be adjusted by negative feedback within a sufficient range. In other embodiments, the operational amplifier 11 can also use the same power source as the pixel circuit, that is, the first power source VDD and the second power source VSS.

Preferably, the display device 1 further comprises: a first resistor R1 and a second resistor R2. The inverting input terminal N of the operational amplifier 11 receives the data voltage $V_{data}$ via the first resistor R1 and is electrically connected to the output terminal OUT via the second resistor R2.

As shown in FIG. 2, the first resistor R1 and the second resistor R2 can both be in a form of a thin film transistor (TFT). A gate of the TFT as the first resistor R1 is electrically connected to the second power terminal of the operational amplifier 11 to receive power from the power source VGL, a first electrode of the TFT as the resistor R1 is connected to the inverting input terminal N of the operational amplifier 11, and a second electrode of the TFT as the resistor R1 is connected to the data voltage $V_{data}$. A gate of the TFT as the second resistor R2 is electrically connected to the second power terminal of the operational amplifier 11 to receive the power source VGL, a first electrode of the TFT as the second resistor R2 is connected to the output terminal OUT of the operational amplifier 11, and a second electrode of the TFT as the second resistor R2 is connected to the inverting input terminal N of the operational amplifier 11. When the gate of the TFT receives the power source VGL, the TFT is turned on. The TFT can be used as a resistor by its characteristics.

Referring to FIG. 1, according to the connection manner of the driving transistor M0, the storage capacitor C0, and the operational amplifier 11 in the drawing, a voltage range of the output terminal of the operational amplifier 11 is ∈ (VGL, VGH). According to the working principle of TFT, it can be known that a current flowing through the light-emitting device D1 is equal to a current flowing through the driving transistor M0, namely:

$$I_{M0} = I_{OLED} = \frac{1}{2} uC_{ox} \frac{W}{L} (VDD \quad V_A \quad V_{th})^2$$

$I_{M0}$ is the current flowing through the driving transistor M0, $I_{OLED}$ is the current flowing through the light-emitting device D1, u is an amplification factor of the operational amplifier 11, W/L is the aspect ratio of the driving transistor M0, VDD is a voltage of the drain of the driving transistor M0, $V_A$ is a voltage of the first common terminal A, and $V_{th}$ is a threshold voltage of the driving transistor M0.

As the voltage $V_A$ at the first common terminal A increases, the current $I_{OLED}$ flowing through the light-emitting device D1 decreases, and the voltage at the second common terminal D decreases. As the voltage $V_A$ decreases, the current $I_{OLED}$ increases, and the voltage at the second common terminal D increases. As the data voltage $V_{data}$ is input, the voltage at the inverting input terminal N of the operational amplifier 11 at this time is $V_{data}$, and the voltage at the non-inverting input terminal P of the operational amplifier 11 is a voltage at the anode of the light-emitting device D1 (that is, a voltage at the second common terminal D). According to the working principle of the operational amplifier, the output is:

$$V_{out} = u(V_P - V_N)$$

Wherein, u is the amplification factor of the operational amplifier 11, namely: u=(R1+R2)/R1; $V_P$ is a non-inverting voltage at the non-inverting input terminal P of the operational amplifier 11, and $V_N$ is an inverting voltage at the inverting input terminal N of the operational amplifier 11. According to the working principle of the operational amplifier, when the non-inverting voltage $V_P$ is greater than the inverting voltage, it can be known from the above that the output voltage $V_{out}$ of the operational amplifier 11 is high, a voltage at the first common terminal A increases, and a voltage at the second common terminal D decreases. As a result, the non-inverting voltage $V_P$ decreases until it is the same as the inverting voltage $V_N$, and at this time the output of the operational amplifier 11 is stabilized. When the non-inverting voltage $V_P$ is less than the inverting voltage $V_N$, it can be known from the above that the output voltage $V_{out}$ of the operational amplifier 11 is low, the voltage at the first common terminal A decreases, and the voltage at the second common terminal D increases. As a result, the non-inverting voltage $V_P$ increases until it is the same as the inverting voltage $V_N$, and at this time, the output of the operational amplifier 11 is stabilized. The output voltage $V_{out}$ output by the operational amplifier 11 can quickly charge the storage capacitor C0 and improve its charging efficiency. Through negative feedback of the operational amplifier circuit, the data voltage $V_{data}$ is the same as the voltage at the second common terminal D. That is to say, the voltage at the second common terminal D corresponding to the current flowing through the light-emitting device D1 with different gray levels is the data voltage. It can be known that, in each pixel unit 101, the current flowing through the light-emitting device D1 is relevant to the voltage at the second common terminal D, and is irrelevant to the driving transistor M0. The driving transistor M0 provides a driving current for the light-emitting device D1 to emit light.

Preferably, the operational amplifier 11 further disconnects a path between the operational amplifier 11 and the pixel unit 101 in response to a switch control signal SW to ensure that the storage capacitor C0 supplies a stable voltage for the driving transistor M0 operating in a saturation region. Therefore, the driving transistor M0 can supply the driving current for the light emission of the light-emitting device D1. Through switch control, the operational amplifier 11 is disconnected after the operation is completed, thus reducing its influence on the light emission of the pixel circuit, and better controlling the operation of the pixel display device.

Specifically, the display device 1 further comprises a switch S1; the switch S1 is electrically connected between the output terminal OUT of the operational amplifier 11 and the first common terminal A, and a control terminal of the switch S1 is configured to receive the switch control signal SW. The switch S1 may be a switching element, a triode, a metal oxide semiconductor (MOS) transistor, and other element that can realize a switch function.

The present application utilizes the negative feedback of the operational amplifier, so that the current flowing through the light-emitting device in each pixel is irrelevant to the driving thin film transistor, thereby solving the problem of non-uniformity of the display panel due to different threshold voltages and channel electron mobility resulting from immature thin film transistor manufacturing processes. Accordingly, the uniformity of the panel is improved. In addition, the output voltage of the operational amplifier can quickly charge the storage capacitor, improve the charging efficiency, and reduce the charging time. At the same time, under the control of the switch, the operational amplifier is turned off when the operations are completed, thus less affecting the light emission of the pixel circuit and better controlling the operations of the pixel display device.

Figure 3:
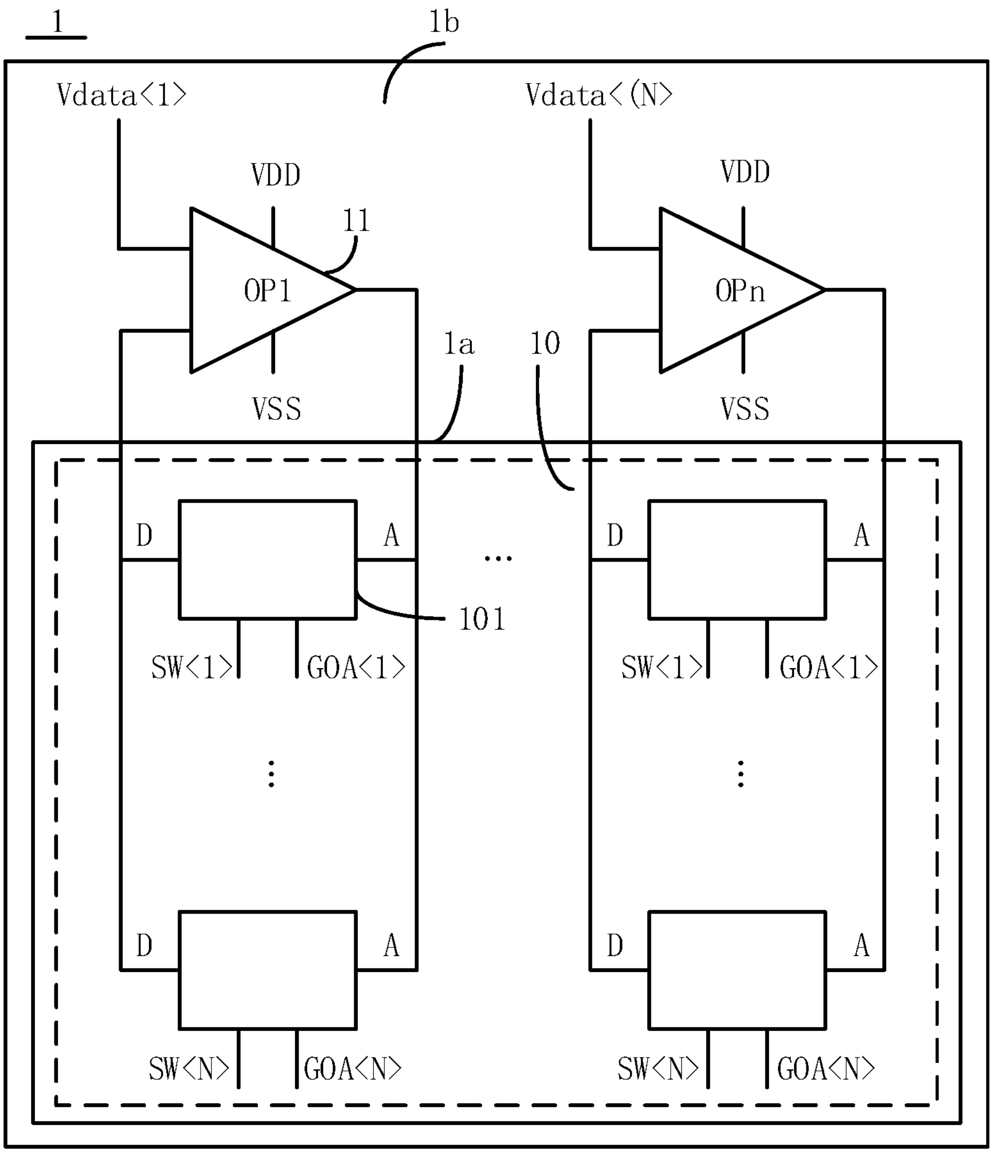
FIG. 3 is a schematic view illustrating the display device according to one embodiment of the present application.
Figure 4:
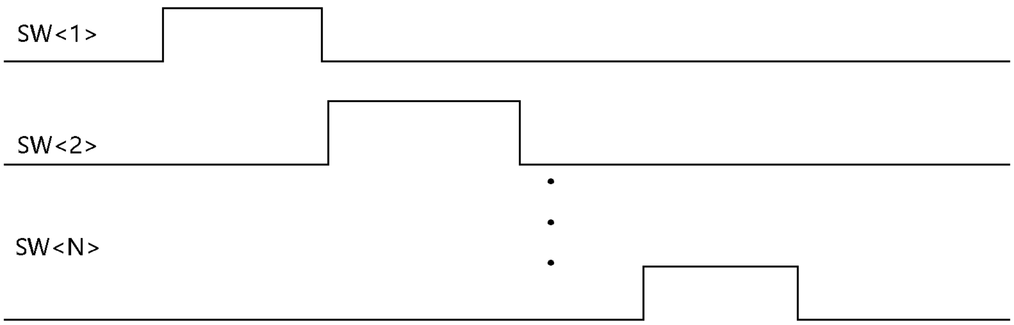
FIG. 4 is a schematic view illustrating a switch control signal waveform of the embodiment shown in FIG. 3.

Please refer to FIGS. 3 and 4. FIG. 3 is a schematic view illustrating the display device according to one embodiment of the present application. FIG. 4 is a schematic view illustrating a switch control signal waveform of the embodiment shown in FIG. 3.

As shown in FIG. 3, the present application provides a display device 1. The display device 1 comprises a pixel circuit 10 and a plurality of operational amplifiers 11 (OP1 to OPn). The pixel circuit 10 comprises a plurality of pixel units 101 arranged in an array. The pixel unit 101 comprises a driving transistor M0, a storage capacitor C0, and a light-emitting device D1. For details of the circuit, please refer to FIG. 1. The operational amplifier 11 and the driving transistor M0 constitute a negative feedback loop for controlling a voltage at an input terminal of the light-emitting device D1 to be the same as a data voltage input externally. The operational amplifier 11 is further configured to charge the storage capacitor C0, so that after the storage capacitor C0 is charged, the light-emitting device D1 is driven by the driving transistor M0 to emit light, wherein a charging time for the operational amplifier 11 to charge the storage capacitor C0 is less than a predetermined value.

In the present embodiment, the pixel units 101 in a same column are electrically connected to the same operational amplifier 11. In detail, a gate of each driving transistor M0 of the pixel units 101 in the same column is electrically connected to a first common terminal A and connected to an output terminal of the same operational amplifier 11. A source of each driving transistor M0 of the pixel units 101 in each column is electrically connected to a second common terminal D and connected to a non-inverting input terminal P of the same operational amplifier 11. The inverting input terminal N of each of the operational amplifiers 11 is electrically connected to a data line to receive the corresponding data voltage $V_{data}$.

The pixel units 101 in a same row disconnect paths between the pixel units 101 and the corresponding operational amplifiers 11 (OP1 to OPn) in response to the same switch control signal SW. As shown in FIG. 3, SW<1> to SW<N> are the switch control signals for disconnecting the connection between the operational amplifiers 11 (OP1 to OPn) and the pixel units 101 after the corresponding operational amplifiers 11 (OP1 to OPn) are stabilized, and thereby the operational amplifier 11 (OP1 to OPn) less affect the light emission of the pixel circuit 101. The pixel units 101 in the same row respond to a same pixel turn-on signal GOA. As shown in FIG. 3, GOA<1> to GOA<N> are the pixel turn-on signals that can control the pixel units 101 in the corresponding rows.

Specifically, the display device 1 comprises a display region 1*a* and a non-display region 1*b* surrounding the display region 1*a*; and the pixel circuit 10 is disposed in the display region 1*a*, and the operational amplifier 11 (OP1 to OPn) is disposed in the non-display region 1*b*. Specifically, the operational amplifier 11 (OP1 to OPn) is arranged between an external driving IC and the pixel circuit 10. The external driving IC inputs the data voltage $V_{data}$ through the data line to supply a current, and the current is amplified through the operational amplifier 11 (OP1 to OPn) and stored in the storage capacitor C0. The corresponding operational amplifier 11 (OP1 to OPn) is disconnected after the storage capacitor C0 is stabilized, so that the driving transistor M0 drives the corresponding light-emitting device D1 to emit light.

Because the operational amplifier 11 can output a higher voltage, the storage capacitor C0 is quickly charged, and the charging time is reduced. For example, to better control the operation of the pixel display device, it is necessary to disconnect the operational amplifier 11 after the operation is completed to ensure that the storage capacitor supplies a stable voltage to the driving transistor M0 operating in a saturation region. The switch control signal SW controls whether the operational amplifier 11 operates in the circuit of the display device 1, as shown in FIG. 4 illustrating the switch control signal waveform.

It can be known from FIG. 4 that when the switch control signal SW is at a low level, the operational amplifier 11 is in a working state, and the storage capacitor C0 is charged at this time. When the switch control signal SW is at a high level, the operational amplifier 11 is disconnected. At this time, the storage capacitor C0 ensures that the driving transistor M0 operates in the saturation region, so that the driving transistor M0 can supply a driving current for the light-emitting device D1 to emit light.

In the present application, driving the light-emitting device to emit light by a current can well compensate for the influence of the threshold voltage and channel electron mobility of the driving TFT on the light-emitting current of the light-emitting device, so that the uniformity of the display panel is improved. Furthermore, the output voltage of the operational amplifier can quickly charge the storage capacitor, improve the charging efficiency, and reduce the charging time; at the same time, through the switch control, the operational amplifier will be disconnected after operations are completed, so the operational amplifier less affects the light emission of the pixel circuit and better control the operations of the pixel display device.

In order to simplify the present disclosure, the foregoing embodiments only disclose the components and configurations of some specific examples, as well as the working principle the present application. The above embodiments only describe some ways to realize the present application, and are only used to help understand the technical solutions and main ideas of the present application. The description of each embodiment has its own emphasis. For those that are not described in detail in one embodiment, reference may be made to related descriptions of other embodiments. Certainly, the above are only preferable embodiments of the present application, and cannot be used to limit the protection scope of the present application.

Those of ordinary skill in the art should understand that they can still modify the technical solutions described in the foregoing embodiments, or make equivalent replacements to some of the technical features; and these modifications or replacements should be deemed to be within the protection scope of the technical solutions of the embodiments of the present application.

It should be noted that modifications and improvements can be made by those of ordinary skill in the art without departing from the concept of the present invention. Such modifications and improvements should fall within the protection scope of the present invention. Therefore, the protection scope of the present invention should be defined by the appended claims.

What is claimed is:

1. A display device, comprising:

a pixel circuit comprising a plurality of pixel units arranged in an array, wherein each of the pixel units comprises a driving transistor, a storage capacitor, and a light-emitting device; and a plurality of operational amplifiers, the pixel units in a same column are electrically connected to the same operational amplifier;

wherein each operational amplifier and the corresponding driving transistor form a negative feedback loop for controlling a voltage at an input terminal of the light-emitting device to be the same as a data voltage input externally;

each operational amplifier is configured to charge the corresponding storage capacitor, so that after the storage capacitor is charged, the light-emitting device is driven by the driving transistor to emit light; a charging time for the operational amplifier to charge the storage capacitor is less than a predetermined value;

wherein a gate of each driving transistor of the pixel units in the same column is electrically connected to a first common terminal and connected to an output terminal of the same operational amplifier; a drain of each driving transistor of the pixel units in the same column is electrically connected to a first power source;

a source of each driving transistor of the pixel units in each column is electrically connected to a second common terminal and connected to a non-inverting input terminal of the same operational amplifier;

a first terminal of the storage capacitor is electrically connected to the first common terminal, and a second terminal of the storage capacitor is electrically connected to a second power source;

an anode of the light-emitting device is configured as its input terminal and is electrically connected to the second common terminal, and a cathode of the light-emitting device is electrically connected to the second power source;

the non-inverting input terminal of each of the operational amplifiers is electrically connected to the second common terminal, and an inverting input terminal of each of the operational amplifiers is configured to receive the data voltage and is coupled to the output terminal of the operational amplifier, and the output terminal of the operational amplifier is coupled to the first common terminal; and a first resistor and a second resistor, wherein the inverting input terminal of each of the operational amplifiers receives the data voltage via the first resistor and is electrically connected to the output terminal of the operational amplifier via the second resistor.

2. The display device according to claim 1, further comprising a switch, wherein the switch is electrically connected between the output terminal of each of the operational amplifiers and the first common terminal, and a control terminal of the switch is configured to receive a switch control signal.

3. The display device according to claim 1, wherein each of the operational amplifiers disconnects a path to the corresponding pixel unit in response to the switch control signal to thereby ensure that the storage capacitor supplies a stable voltage to the driving transistor operating in a saturation region.

4. The display device according to claim 1, wherein the pixel units in a same row disconnect a path to the corresponding operational amplifier in response to a same switch control signal.

5. The display device according to claim 1, wherein the pixel units in a same row respond to a same pixel turn-on signal.

6. The display device according to claim 1, wherein the inverting input terminal of each of the operational amplifiers is electrically connected to a data line to receive the corresponding data voltage.

7. A display device, comprising:

a pixel circuit and at least one operational amplifier;

wherein the pixel circuit comprises at least one pixel unit, and the pixel unit comprises a driving transistor, a storage capacitor, and a light-emitting device;

a gate of the driving transistor is electrically connected to a first common terminal, a drain of the driving transistor is electrically connected to a first power source, and a source of the driving transistor is electrically connected to a second common terminal;

a first terminal of the storage capacitor is electrically connected to the first common terminal, and a second terminal of the storage capacitor is electrically connected to a second power source;

an anode of the light-emitting device is configured as an input terminal of the light-emitting device and is electrically connected to the second common terminal, and a cathode of the light-emitting device is electrically connected to the second power source;

a non-inverting input terminal of the operational amplifier is electrically connected to the second common terminal, an inverting input terminal of the operational amplifier is configured to receive a data voltage and coupled to an output terminal of the operational amplifier, and the output terminal of the operational amplifier is coupled to the first common terminal;

the operational amplifier and the driving transistor constitute a negative feedback loop for controlling a voltage at the input terminal of the light-emitting device to be the same as the data voltage which is input externally; and the operational amplifier is configured to charge the storage capacitor, so that after the storage capacitor is charged, the light-emitting device is driven by the driving transistor to emit light, wherein a charging time for the operational amplifier to charge the storage capacitor is less than a predetermined value.

8. The display device according to claim 7, wherein the operational amplifier disconnects a path between the operational amplifier and the pixel unit in response to a switch control signal to ensure that the storage capacitor supplies a stable voltage to the driving transistor operating in a saturation region.

9. The display device according to claim 8, further comprising a switch, wherein the switch is electrically connected between the output terminal of the operational amplifier and the first common terminal, and a control terminal of the switch is configured to receive the switch control signal.

10. The display device according to claim 7, further comprising a first resistor and a second resistor, wherein the inverting input terminal of the operational amplifiers receives the data voltage via the first resistor and is electrically connected to the output terminal of the operational amplifier via the second resistor.

11. The display device according to claim 7, wherein the display device comprises multiple operational amplifiers, and the pixel circuit comprises multiple pixel units arranged in an array, wherein the pixel units in a same column are electrically connected to the same operational amplifier.

12. The display device according to claim 11, wherein a gate of each driving transistor of the pixel units in a same column is electrically connected to the first common terminal and connected to the output terminal of the same operational amplifier, and a source of each driving transistor of the pixel units in each column is electrically connected to the second common terminal and connected to the non-inverting input terminal of the same operational amplifier; and the inverting input terminal of each of the operational amplifiers is electrically connected to a data line to receive the corresponding data voltage.

13. The display device according to claim 11, wherein the pixel units in a same row disconnect a path to the corresponding operational amplifier in response to a same switch control signal.

14. The display device according to claim 11, wherein the pixel units in a same row respond to a same pixel turn-on signal.

15. The display device according to claim 7, wherein the display device comprises a display region and a non-display region surrounding the display region; and the pixel circuit is disposed in the display region, and the operational amplifier is disposed in the non-display region.

* * * * *